US012695619B2

(12) United States Patent
    D. M. Machado et al.

(10) Patent No.: US 12,695,619 B2
(45) Date of Patent: Jul. 28, 2026

(54) DYNAMIC KEY MANAGEMENT

(71) Applicant: Coinbase, Inc., Oakland, CA (US)

(72) Inventors: Leonardo D. M. Machado, London (GB); Nir Steinherz, Tel Aviv (IL); Guy Pe'er, Talmey Yechiel (IL); Yehuda Lindell, Petah Tikva (IL)

( * ) Notice: Subject to any disclaimer, the term of this patent is extended or adjusted under 35 U.S.C. 154(b) by 244 days.

(21) Appl. No.: 18/208,201

(22) Filed: Jun. 9, 2023

(65) Prior Publication Data

US 2024/0414004 A1    Dec. 12, 2024

(51) Int. Cl.
H04L 9/32      (2006.01)
H04L 9/08      (2006.01)

(52) U.S. Cl.
CPC ............ H04L 9/3247 (2013.01); H04L 9/085 (2013.01); H04L 9/0861 (2013.01); *H04L 2209/46* (2013.01)

(58) Field of Classification Search
CPC ..... H04L 9/3247; H04L 9/085; H04L 9/0861; H04L 2209/46
See application file for complete search history.

(56) References Cited

U.S. PATENT DOCUMENTS

| | | | |
|---|---|---|---|
| 2019/0372768 A1* | 12/2019 | Veeningen | ................ H04L 9/14 |
| 2020/0044863 A1* | 2/2020 | Yadlin | ........................ G06F 9/54 |
| 2020/0084048 A1* | 3/2020 | Lindell | ................. H04L 9/3255 |
| 2020/0134204 A1* | 4/2020 | Furukawa | ............... G06F 21/64 |
| 2020/0153640 A1* | 5/2020 | Ranellucci | ............ H04L 9/3255 |
| 2020/0169410 A1* | 5/2020 | Wainblat | ................... H04L 9/14 |
| 2021/0194676 A1* | 6/2021 | Mandal | ................. H04L 9/0894 |
| 2022/0045867 A1* | 2/2022 | Beery | ................... H04L 9/0861 |
| 2023/0006836 A1* | 1/2023 | Carter | ................... H04L 9/3239 |
| 2023/0059492 A1* | 2/2023 | Vinayagamurthy | ........................ G06F 16/24565 |
| 2023/0188329 A1* | 6/2023 | Yeo | ...................... G06F 21/6218 713/193 |
| 2023/0289462 A1* | 9/2023 | Subramaniam | ...... G06Q 10/109 |
| 2023/0299942 A1* | 9/2023 | Be'Ery | ................. H04L 9/3255 713/171 |
| 2024/0146542 A1* | 5/2024 | Kang | ......................... H04L 9/08 |
| 2024/0178989 A1* | 5/2024 | Dolev | ..................... G06N 3/082 |
| 2024/0313953 A1* | 9/2024 | Kreuter | ................... H04L 9/085 |
| 2024/0405976 A1* | 12/2024 | Chen | ....................... H04L 9/085 |

* cited by examiner

*Primary Examiner* — Darshan I Dhruv
(74) *Attorney, Agent, or Firm* — Holland & Hart LLP

(57) ABSTRACT

Methods, systems, and devices for data management are described. A custodial token platform may communicate with a client to support a multi-party computation (MPC) signature for a message. A central coordinator may receive, from the client, a request to sign a message using respective key shares generated by MPC nodes. The key shares may be generated in accordance with an access structure, where the access structure is configured based on a respective set of parameters for the MPC nodes. The central coordinator may transmit a request to execute a MPC signature using a respective key share. The central coordinator may maintain data associated with execution of the MPC signature function by a subset of the MPC nodes using the respective key shares. Additionally, the central coordinator may transmit, to the client, a result of execution of the MPC signature function by the subset of the MPC nodes.

18 Claims, 10 Drawing Sheets

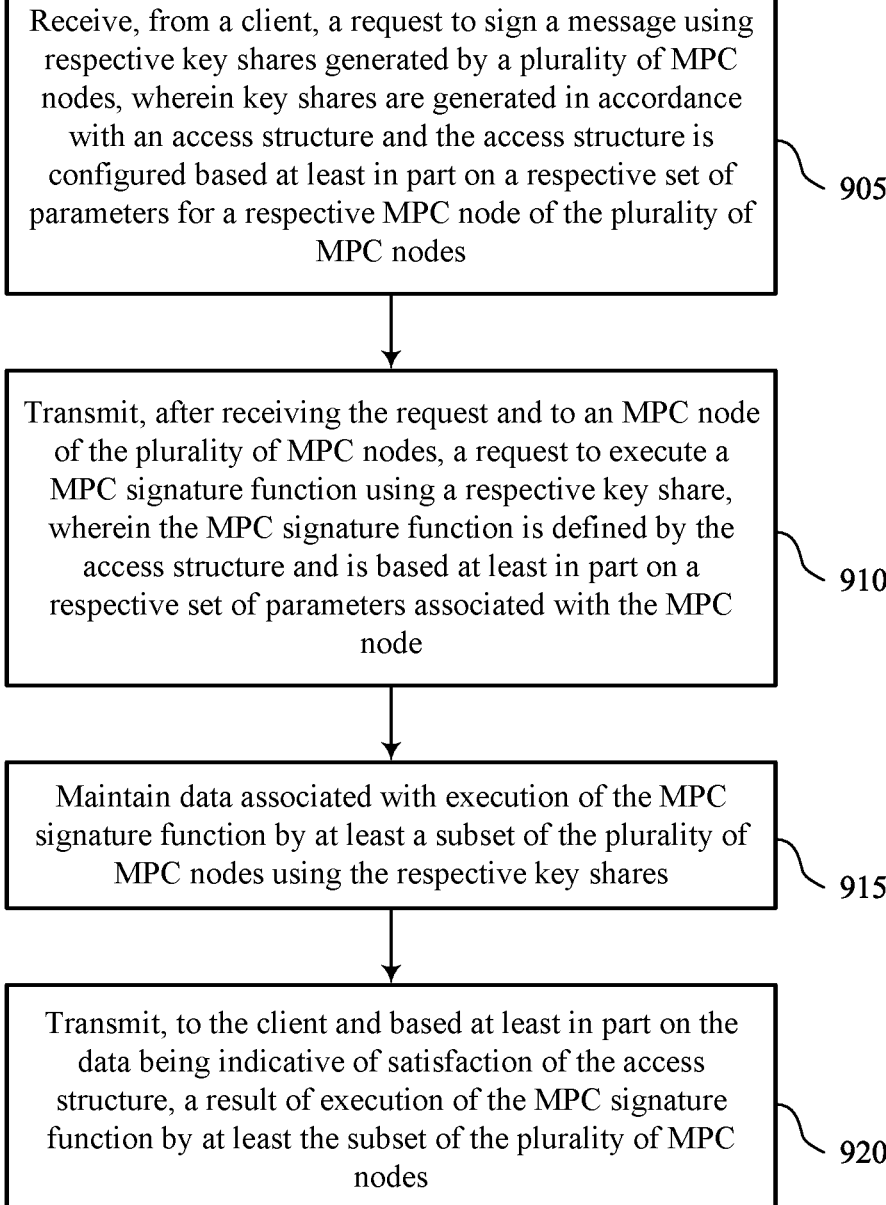

Receive, from a client, a request to sign a message using respective key shares generated by a plurality of MPC nodes, wherein key shares are generated in accordance with an access structure and the access structure is configured based at least in part on a respective set of parameters for a respective MPC node of the plurality of MPC nodes

905

Transmit, after receiving the request and to an MPC node of the plurality of MPC nodes, a request to execute a MPC signature function using a respective key share, wherein the MPC signature function is defined by the access structure and is based at least in part on a respective set of parameters associated with the MPC node

910

Maintain data associated with execution of the MPC signature function by at least a subset of the plurality of MPC nodes using the respective key shares

915

Transmit, to the client and based at least in part on the data being indicative of satisfaction of the access structure, a result of execution of the MPC signature function by at least the subset of the plurality of MPC nodes

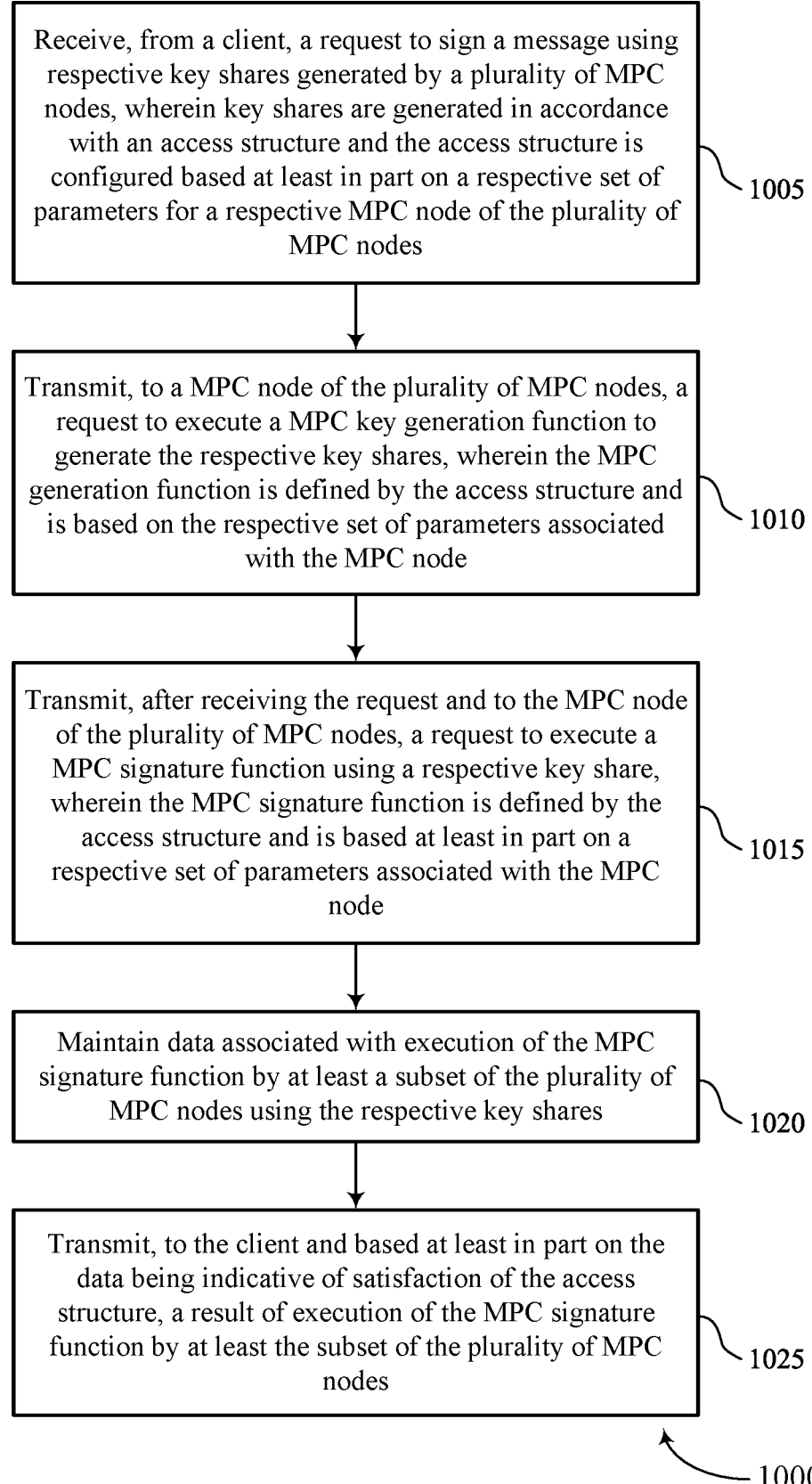

Receive, from a client, a request to sign a message using respective key shares generated by a plurality of MPC nodes, wherein key shares are generated in accordance with an access structure and the access structure is configured based at least in part on a respective set of parameters for a respective MPC node of the plurality of MPC nodes

1005

Transmit, to a MPC node of the plurality of MPC nodes, a request to execute a MPC key generation function to generate the respective key shares, wherein the MPC generation function is defined by the access structure and is based on the respective set of parameters associated with the MPC node

1010

Transmit, after receiving the request and to the MPC node of the plurality of MPC nodes, a request to execute a MPC signature function using a respective key share, wherein the MPC signature function is defined by the access structure and is based at least in part on a respective set of parameters associated with the MPC node

1015

Maintain data associated with execution of the MPC signature function by at least a subset of the plurality of MPC nodes using the respective key shares

1020

Transmit, to the client and based at least in part on the data being indicative of satisfaction of the access structure, a result of execution of the MPC signature function by at least the subset of the plurality of MPC nodes

DYNAMIC KEY MANAGEMENT

FIELD OF TECHNOLOGY

The present disclosure relates generally to data management, including techniques for dynamic key management.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

Cryptographic keys may be used to transact and interact with blockchain networks. Cryptographic keys may also be used to perform various operations outside of blockchain networks. Generally, a single party is required to hold or have access to a private key to support cryptographic or blockchain operations using a private key.

BRIEF DESCRIPTION OF THE DRAWINGS

FIGS. 9 and 10 show flowcharts illustrating methods that support dynamic key management in accordance with aspects of the present disclosure.

DETAILED DESCRIPTION

Figure 1:
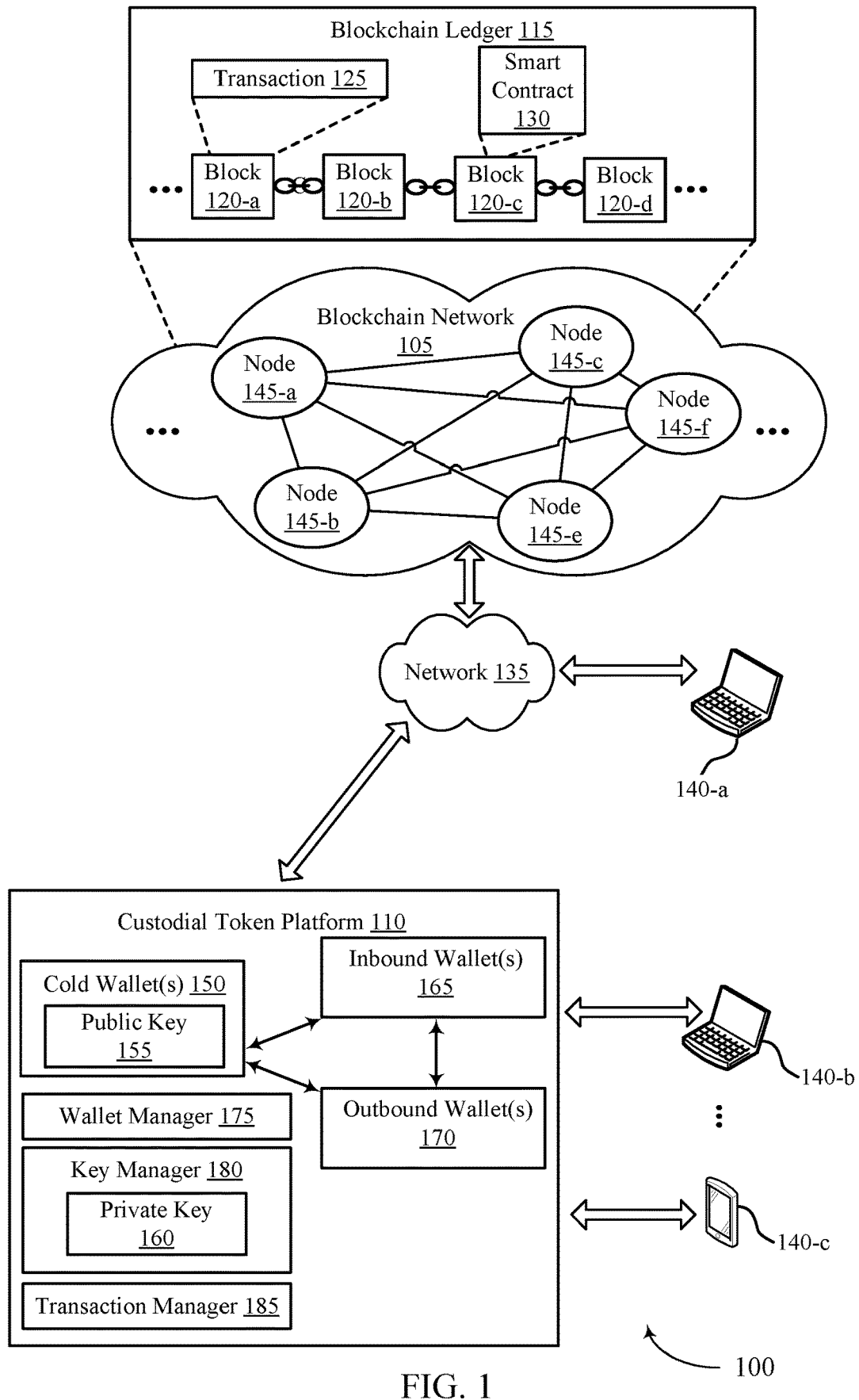
FIG. 1 illustrates an example of a computing environment that supports dynamic key management in accordance with aspects of the present disclosure.

A key management system may be used for cryptographic transactions that occur via cryptographic keys. In some cases, a cryptographic key may be used for a transaction of digital assets via blockchain. For example, an application (e.g., a wallet application) of a wireless device may store (e.g., locally) a private key. In some cases, the private key may be used to sign transactions while a corresponding public key may be a sharable identifier generated in association with the private key. The blockchain network may verify the transaction, among other functions, based on the public key and the signature. For security reasons, among other reasons, it may be desirable for no-one party or device to control a private key. For example, institutional trading clients may manage a significant amount of funds associated with one or more blockchain networks, and some parties may not want a single person or device to have the ability to control transfer of such funds. However, current systems for private key management may not be adaptable to dynamic and various key distribution mechanisms.

In some cases, trade-offs may exist between security and usability for cryptographic transactions via cryptographic keys. For example, a higher security level may be associated with a lower usability level, and vice-versa. In some examples, a key management system may configure access to private keys for signing and executing transactions based on a transaction type. For example, a transaction or message may be signed (e.g., automatically) via a programmatic technique (e.g., for a relatively low security transaction). Additionally, or alternatively, a transaction or message may be signed via one or more of a limited set of keys associated with users (e.g., for a relatively high security transaction). In some cases, a cryptographic transaction may not offer flexibility of choice for key creation and utilization. For example, a user or system may not be able to determine the security or speed of a transaction. In some cases, key management systems offer fixed key creation parameters such that some key management techniques may not be supported, the keys may not be modified after creation, or both. For example, key management systems may have usability and security levels that may not be configurable by the user.

Techniques described herein may enable flexibility of choice for key creation and use. For example, a key management system may grant security properties (e.g., selected properties) to each key share of a set of key shares. In some cases, a user may select properties (e.g., geographic locations, operation type, storage type, etc.) associated with each node of a set of nodes with key shares. For example, a user may provide or select a combination of properties to a key management system, and the key management system may generate and use key shares based on the combination of properties. Additionally, or alternatively, the key management system may manage the generation and sharing via an access structure. In some cases, a central coordinator, in order to use the private key, may enforce the access structure and coordinate the message signing by the various nodes and may cause a signed transaction to be broadcast to a blockchain network based on satisfaction of the access structure. For example, the access structure may enforce one or more Boolean expressions, one or more threshold requirements, or both. In some cases, the flexible key creation system may increase resilience, security, and availability for the users and organizations.

FIG. 1 illustrates an example of a computing environment 100 that supports dynamic key management in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-a, 120-b, 120-c, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a, 140-b, or 140-c) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-a may provide user inputs via the computing device 140-a, which may result in commands, data, or any combination thereof being communicated via the network 135 to the computing system custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, store, manage, or otherwise use private keys that are associated with user wallets and internal wallets. For example, if a user wishes to withdraw a token associated with the user account to an external wallet address, key manager 180) may sign a transaction associated with a wallet of the user and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150) may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160, which may be stored and managed by the key manager 180, as described herein. The public key 155 may be used to publicly transact via the cold wallet 150, meaning that another wallet may enter the public key 155 into a transaction such as to move assets from the wallet to the cold wallet 150. The private key 160 of the key manager 180 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

In some examples, the custodial token platform 110 may support an enhanced key management system (e.g., the key manager 180) that may support dynamic key generation and use, as described herein. In some cases, a central coordinator of the key management system may receive, from a client (e.g., the computing device 140-*a*, the computing device 140-*b*, the computing device 140-*c*, etc.) a request to sign a message. For example, the request may be to sign the message using respective key shares generated by a plurality of multi-party computation (MPC) nodes. In some cases, key shares may be generated in accordance with an access structure. Additionally, or alternatively, the access structure may be configured based on a respective set of parameters for the respective MPC node of the plurality of MPC nodes.

In some cases, the central coordinator may transmit, to one or more nodes associated with the access structure, a request to execute an MPC signature function using a respective key share. In some examples, the MPC signature function may be defined by the access structure and may be based on a respective set of parameters associated with the MPC node. In some examples, the central coordinator may transmit a result of execution of the MPC signature function by at least a subset of the plurality of MPC nodes to the client based on the data being indicative of satisfaction of the access structure. As such, a message or transaction, which is signed based on the executed signature functions, may be broadcast via the blockchain network 105 such as to transfer one or more crypto tokens, control smart contracts, stake crypto tokens, perform governance procedures (e.g., voting on proposals), or the like.

Figure 2:
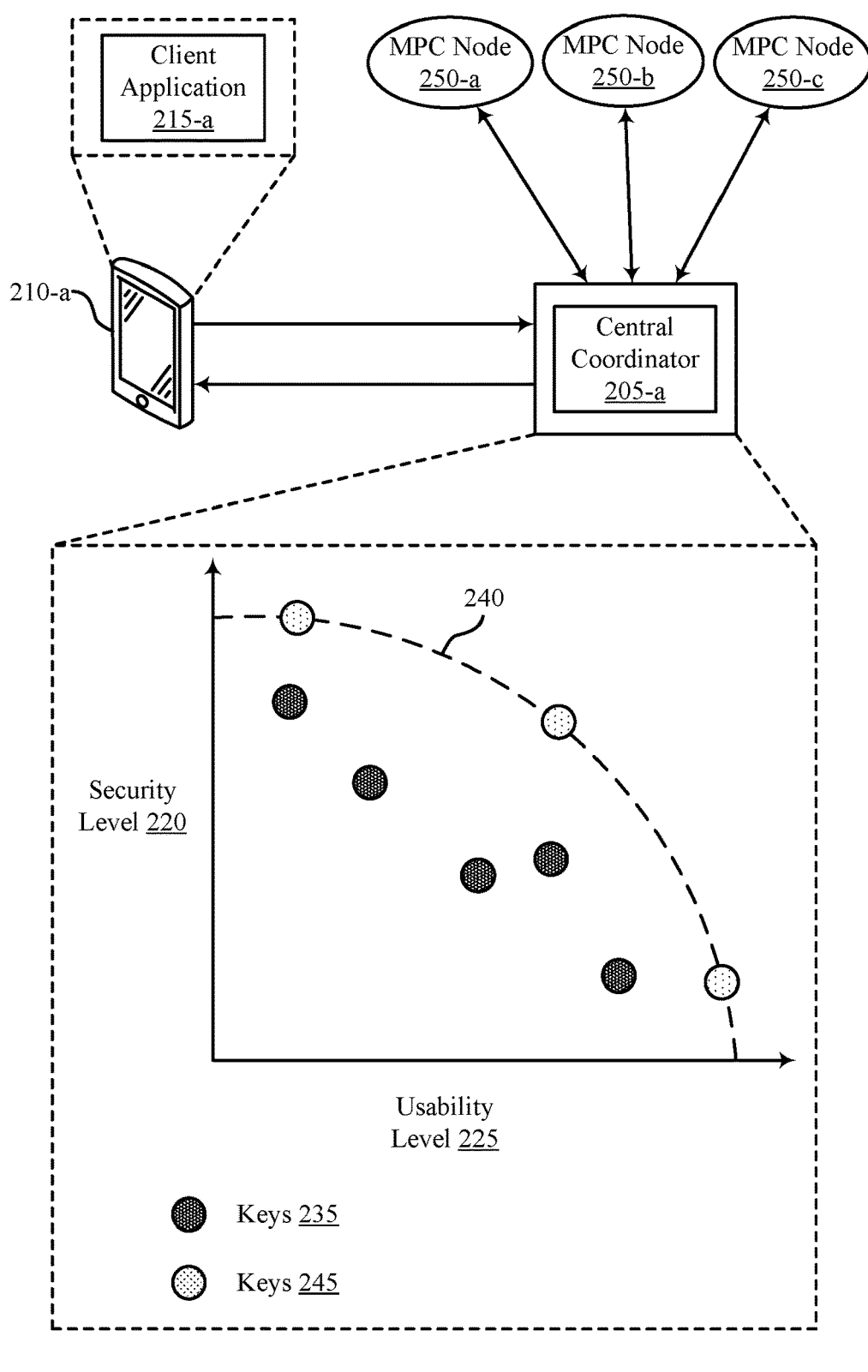
FIG. 2 shows an example of a computing environment that supports dynamic key management in accordance with aspects of the present disclosure.

FIG. 2 shows an example of a computing environment 200 that supports dynamic key management in accordance with aspects of the present disclosure. The computing environment 200 may include a user device 210-*a* and a quantity of nodes (i.e., an MPC node 250-*a*, an MPC node 250-*b*, and an MPC node 250-*c*). The user device 210-*a* may be an example of a computing device 140 as described with respect to FIG. 1 and may be used to access services provided by the custodial token platform 110, including the key manager 180.

As described herein, the computing environment 200 may use cryptographic key sharing and MPC algorithms to generate and manage cryptographic keys (or key shares) that are used to support cryptographic transactions, which may be used for blockchain messages and transactions. For example, the user device 210-*a* may transmit a request to sign a message using a private key to the central coordinator 205-*a*. In some examples, the message may be associated with a blockchain transaction. According to techniques described herein, before receiving the request, the central coordinator 205-*a* may request creation of a quantity of key shares of the private key at selected nodes (e.g., the MPC node 250-*a*, the MPC node 250-*b*, and the MPC node 250-*c*). For example, the selected nodes may create the key shares (e.g., independently via an MPC protocol) such that the key shares are only in the selected nodes (e.g., the key shares do not exist outside the selected nodes). In some cases, trade-offs may exist between a security level 220 and a usability level 225 for cryptographic transactions via cryptographic keys. For example, a higher security level may be associated with a lower usability level, and vice-versa. In some cases, there may not be flexibility for key creation and utilization. For example, in some implementations, a client system (e.g., user device 210-*a*) may need to make a choice between the security level 220 and usability level 225 in selecting one of the set of keys 235, and after such a choice is made, the key may not be adjusted to satisfy needs. Thus, a first key 235 may support a first security level and a first usability level while a second key 235 may support a second security level and a second usability level, etc. In such cases, the security level 220 and the usability level 225 associated with a cryptographic transaction may not be configurable by the user.

As such, keys 235 associated with some key management systems may be generated for specific purposes. For example, a user may select keys that are associated with cold wallets (e.g., cold wallets 150 of FIG. 1) of the custodial token platform configured such as to be associated with a higher security level but a low usability level 225. Self-custody wallets may be associated with lower security levels 220 by higher useability levels 225. Accordingly, the selection and use of a key may be based on the tradeoffs between the security level 220 and the usability level 225.

The techniques described herein support improved multi-party key management, distribution/generation, and use (e.g., keys 245), which may result in improved security level 220 and usability level 225 as well as flexibility between security and flexibility. That is, the user and system may leverage the techniques described herein to select parameters, security properties, etc., that results in a "key" that is positioned anywhere on curve 240 (or elsewhere). Further, these selections and key properties may be adjusted based on the needs of the users and systems. The key management techniques described here rely on MPC techniques, and MPC may refer to a cryptography field with the objective of creating protocols for parties to jointly compute a function without revealing individual inputs. An MPC node, which may be an example of nodes 250, may be configured to operate online and synchronously and may be configured to execute a signing protocol (e.g., an MPC signature function) and return a signed payload to the central coordinator 205-*a*.

As such, the MPC node may function as a source of truth and each MPC node may be independent. Further, each MPC node may be an example of a fully independent key management instance or system and each instance can be deployed in separate infrastructures and technology stacks. The MPC nodes may collaborate through MPC algorithms to generate, use, and manage keys. An example MPC function that may be performed by the MPC nodes (based on coordination by central coordinator 205-*a*) include a key generation function that is implemented using an MPC protocol, and the function is executed in a manner such that a cryptographic key is jointly generated by multiple parties (MPC nodes), and each party may receive access to, and only to, a corresponding key share that may be locally stored. Another example MPC function that may be performed by the MPC nodes (based on coordination by the central coordinator 205-*a*, or service or component) is a cryptographic signing function that is implemented using an MPC protocol in order to use key shares, instead of a fully assembled key, to sign a transaction in a manner such that other parties (e.g., other MPC nodes) do not have knowledge about the key shares of other parties. As such, the secrecy of the key is preserved even when the key is being used. Other cryptographic operations involving private keys may be implemented using MPC algorithms within the scope of the present disclosure.

Figure 3:
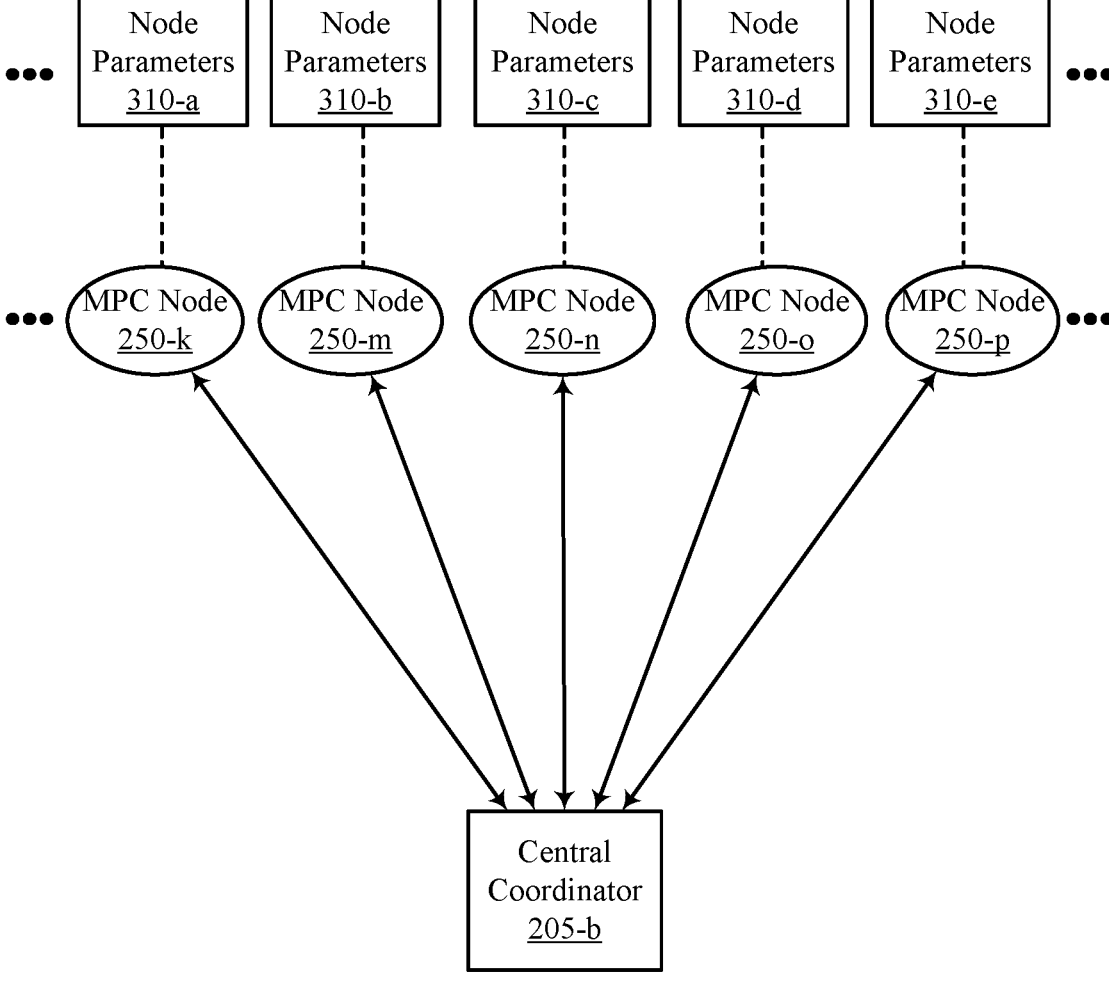
FIG. 3 shows an example of a key distribution diagram that supports dynamic key management in accordance with aspects of the present disclosure.

As described in further detail with respect to FIG. 3, each MPC node may be associated with a set of parameters, such as geographic location, whether a node is automated or not, a technology stack, etc. Further, when a user is accessing the key management service (e.g., via the client application 215-*a*) described herein, the user may select or configure a set of parameters for the particular use case for MPC key operation. As such, the service may select a set of MPC nodes to manage keys for the user based on the user selected or configured parameters. The service may also configure an access structure that manages key share generation and use. The access structure may be based on the selected parameters and corresponding nodes.

Accordingly, the central coordinator 205-*a* may select the MPC node 250-*a*, the MPC node 250-*b*, and the MPC node 250-*c* based on parameters (or node selection based on parameters) received from the user device 210-*a* and the access structure. For example, the user device 210-*a* may provide or select a set of parameters associated with a security level 220), a usability level 225, or both. In some cases, key creation parameters may be configurable by the user device 210-*a*. For example, each node may be associated with properties such that the combination of the selected nodes satisfy the key creation parameters set by the user device 210-*a*. In some examples, the key creation parameters may be based on selected security properties (e.g., key shares in one or more geographic locations, key shares associated with a quorum), and the nodes may be based on the selected security parameters.

In some cases, the key shares may be generated by the selected nodes according to the access structure and using MPC operations. For example, the access structure may be referred to as a general access structure. In some cases, the access structure may include an expression with a combination of a set of operators and a set of key shares (e.g., each key share being associated with a respective node of the selected nodes). In some cases, the access structure may enable combinations (e.g., complex combinations) of key shares associated with nodes to increase resilience, security, and availability for cryptographic transactions. As such, any quantity of nodes and key shares may be used to generate the desired outcome.

In some cases, the selected nodes may store key shares of the private key. For example, each node of the selected nodes may store a key share of the private key and collaborate to produce a cryptographic signature for the message. Thus, at the time of use, the nodes holding key shares may collaborate using the MPC algorithms to allow the use of the keys. However, no key share may leave the respective node, and the complete private key may never be "assembled" in one location. As such, the security of key utilization is increased using the techniques described herein.

To use the key, the client application 215-a may transmit a request (to use the key) to the service, and the central coordinator 205-a may be instantiated to coordinate the MPC functionality using the key shares. For example, in response to receiving the request, the central coordinator 205-a may transmit a request to the selected nodes to execute an MPC signature function using the key shares. In some cases, the MPC signature function may be defined by the access structure and may be based on the key creation parameters. The central coordinator 205-a may transmit the requests based on the access structure associated with the key. In some cases, the central coordinator 205-a may maintain data (e.g., store in an encrypted form unreadable by the central coordinator 205-a) associated with execution of the MPC signature function by the selected nodes using the key shares. Additionally, or alternatively, the central coordinator 205-a may transmit a result of execution of the MPC signature function by at least a subset of the selected nodes. For example, the transmission of the result of execution may be based on the data (i.e., the maintained data) being indicative of satisfaction of the access structure. Thus, after the signature is created after signing the transaction by the various key shares based on the access structure, the central coordinator 205-a, one of the nodes 250, or an associated party or system may broadcast a transaction via a blockchain network (e.g., the blockchain network 105 of FIG. 1) to cause transfer one of one or more crypto tokens, crypto assets, control smart contracts, stake crypto tokens, perform governance procedures (e.g., voting on proposals), or the like.

FIG. 3 shows an example of a key distribution diagram 300 that supports dynamic key management in accordance with aspects of the present disclosure. The key distribution diagram 300 may include a central coordinator 205-b and a quantity of nodes (i.e., a MPC node 250-k, a MPC node 250-m, a MPC node 250-n, a MPC node 250-o, and a MPC node 250-p), which may be examples of corresponding devices described with respect to FIG. 1 and FIG. 2.

As described herein, the central coordinator 205-b may select a subset of nodes from a set of nodes based on a selection of a set of parameters for a key or based on selection of the nodes (based on the associated parameters) received from a user. For example, the central coordinator may request generation of key shares of the key at a MPC node 250-k with corresponding node parameters 310-a, a MPC node 250-m with corresponding node parameters 310-b, a MPC node 250-n with corresponding node parameters 310-c, a MPC node 250-o with corresponding node parameters 310-d, a MPC node 250-p with corresponding node parameters 310-e, or a combination thereof, where the combination of the corresponding node parameters for the selected subset of nodes satisfies the set of parameters from the user. The coordinator requests the generation via the MPC key generation function such that the private key itself may not exist in or may not be available to one place, node, system, party, etc. Additionally, the key shares are generated by the MPC nodes 250 such that the key shares may not be available to other parties or systems.

For example, node parameters 310-a may include a geographic location (e.g., associated with a set of regulation and governance rules). In some cases, the node parameters 310-a may include a first geographic location (e.g., the United States) while the node parameters 310-b include a second geographic location (e.g., Europe). For example, a user may request that the key be domiciled in the second geographic location, and, accordingly, the central coordinator 205-b may select a set of nodes with respective node parameters including the second geographic location (e.g., the central coordinator 205-b may select the MPC node 250-m but not the MPC node 250-k). In some cases, the central coordinator may select the MPC node 250-k associated with node parameters 310-a including the first geographic location and at least the MPC node 250-m and the MPC node 250-n associated with the node parameters 310-b and the node parameters 310-c, respectively, when both the node parameters 310-b and the node parameters 310-c include the second geographic location. For example, the central coordinator 205-b may select nodes with respective node parameters such that a threshold (e.g., majority) of the selected subset of the nodes satisfy the parameters from the user.

Additionally, or alternatively, node parameters 310-a may include whether the MPC node 250-k is fully automated, whether the MPC node 250-k is operated via AI, or whether the MPC node 250-k is human-operated. For example, the node parameters 310-a may indicate that the MPC node 250-k is fully automated, the node parameters 310-b may indicate that the MPC node 250-m is operated via AI, and the node parameters 310-c may indicate that the MPC node 250-n is human-operated. In some cases, the central coordinator 205-b may select a quantity of nodes with respective node parameters indicating that the node is fully automated, operated via AI, or human-operated (e.g., a quantity of fully automated nodes, a quantity of AI-operated nodes, a quantity of human-operated nodes, etc.) according to the parameters received from the user.

Additionally, or alternatively, the central coordinator 205-b may select the MPC node 250-k and the MPC node 250-n associated with the node parameters 310-a and the node parameters 310-c, respectively such that the MPC node 250-k is fully automated, and the MPC node 250-n is human-operated. In some examples, the central coordinator 205-b may select the MPC node 250-k and the MPC node 250-n to generate a key (or key share) which is human-operated. For example, key shares generated by the MPC node 250-k and the MPC node 250-n may be associated with human approval for a signature using the key to occur.

Additionally, or alternatively, the central coordinator 205-b may select the MPC node 250-k and the MPC node 250-m associated with the node parameters 310-a and the node parameters 310-b, respectively such that the MPC node 250-k is fully automated, and the MPC node 250-m is operated via AI. In some examples, the central coordinator 205-b may select the MPC node 250-k and the MPC node 250-m to generate a key which is operated via AI. For example, a key with key shares generated by the MPC node 250-k and the MPC node 250-m may be associated with an AI operation for a signature using the key to occur.

In some cases, the node parameters 310-d may indicate that the MPC node 250-o is operated via AI according to policies associated with a first geographic location and the MPC node 250-o is in a second geographic location. For example, the MPC node 250-*o* may operate in the second geographic location (e.g., Europe) while operating via AI according to policies of the first geographic location (e.g., the United States). Additionally, or alternatively, the MPC node 250-*p* may operate in the first geographic location (e.g., the United States) while operating via AI according to policies of the second geographic location (e.g., Europe).

In some cases, a node may be human-operated and located in a physical datacenter (e.g., with physical security controls). In some cases, the node may improve the physical security of the transaction. For example, a quantity of nodes associated with online infrastructure may be controlled (e.g., by an attacker) while the node located in the physical datacenter is secure. In some cases, the node located in the physical datacenter may protect the original key (e.g., by preventing the attacker from constructing the original key from the one or more of the key shares).

In some cases, selection of the nodes according to parameters from the user may support an approval quorum (e.g., a threshold operator). For example, a set of human-operated nodes (e.g., in a wireless device) may be used to generate an authorization scheme where a quorum of a quantity of nodes (e.g., a minimum "M" people) of a set of nodes (e.g., a total "N" people) may approve a transaction. In some cases, the approval quorum may be cryptographically enforced (e.g., using MPC techniques) and may not be bypassed (e.g., via software).

In some examples, the node parameters 310-*a* may indicate that the MPC node 250-*k* is stored in a public cloud, the node parameters 310-*b* may indicate that the MPC node 250-*m* is stored in a private datacenter, and the node parameters 310-*c* may indicate that the MPC node 250-*n* is stored in a datacenter type of the MPC node 250-*n*. For example, the central coordinator 205-*b* may select the MPC node 250-*k*, the MPC node 250-*m*, and the MPC node 250-*n* such that the key with key shares generated by the selected subset of nodes is a multi-cloud key. It should be noted other types of node parameters are possible within the context of the present disclosure.

Additionally, or alternatively, the selected subset of nodes may improve security against zero-day exploits. For example, a combination of nodes in different technology stacks may increase the system security against zero-day exploits. Similarly, in some cases, the subset of selected nodes may improve resiliency against cloud failures. For example, the key with key shares generated by the selected nodes, where each of the selected nodes may be associated with a different cloud infrastructure, may be more resilient to failure of a specific cloud infrastructure (i.e., as opposed to where each of the selected nodes may be associated with a same cloud infrastructure). More particularly, because a first key share may be managed by a MPC node 250 having a first technology stack (e.g., Amazon R Web services) and a key share may be managed by a node having a second technology stack (e.g., Google R Cloud), exploitation of one of the technology stacks may not comprise the entire key or the other technology stack. As used herein, the term "datacenter type" may refer to the technology stack, cloud infrastructure type, or both.

In some cases, a node may be deployed in a datacenter type of the MPC node (e.g., a customer infrastructure). For example, the central coordinator 205-*b* may deploy key shares in nodes associated with the customer infrastructure, a service provider infrastructure, or both. In some cases, deploying a key share in a node associated with the customer infrastructure or the service provider infrastructure may increase security via segregation and customer control over key shares.

Accordingly, various combinations of nodes, node types, and operators may be used to define an access structure that is used to generate and manage use of the keys. For example, a key may be associated with a first key share that is generated by a node in a cloud infrastructure and a second key share that is associated with a quorum operation. As such, to use the corresponding key, the central coordinator 205-*b* may use the access structure to request or instruct the MPC node to perform an MPC signature function using the first key share and a respective MPC signature function for M out of N nodes having the second key share (or a portion thereof). Further, the access structure may define how the keys shares are generated by the corresponding nodes. As described herein, the central coordinator 205-*b* (or another instance of a central coordinator) may communicate with respective nodes (e.g., transmitting key share generation requests) to cause the nodes to generate the corresponding key shares using MPC functionality.

Figure 4:
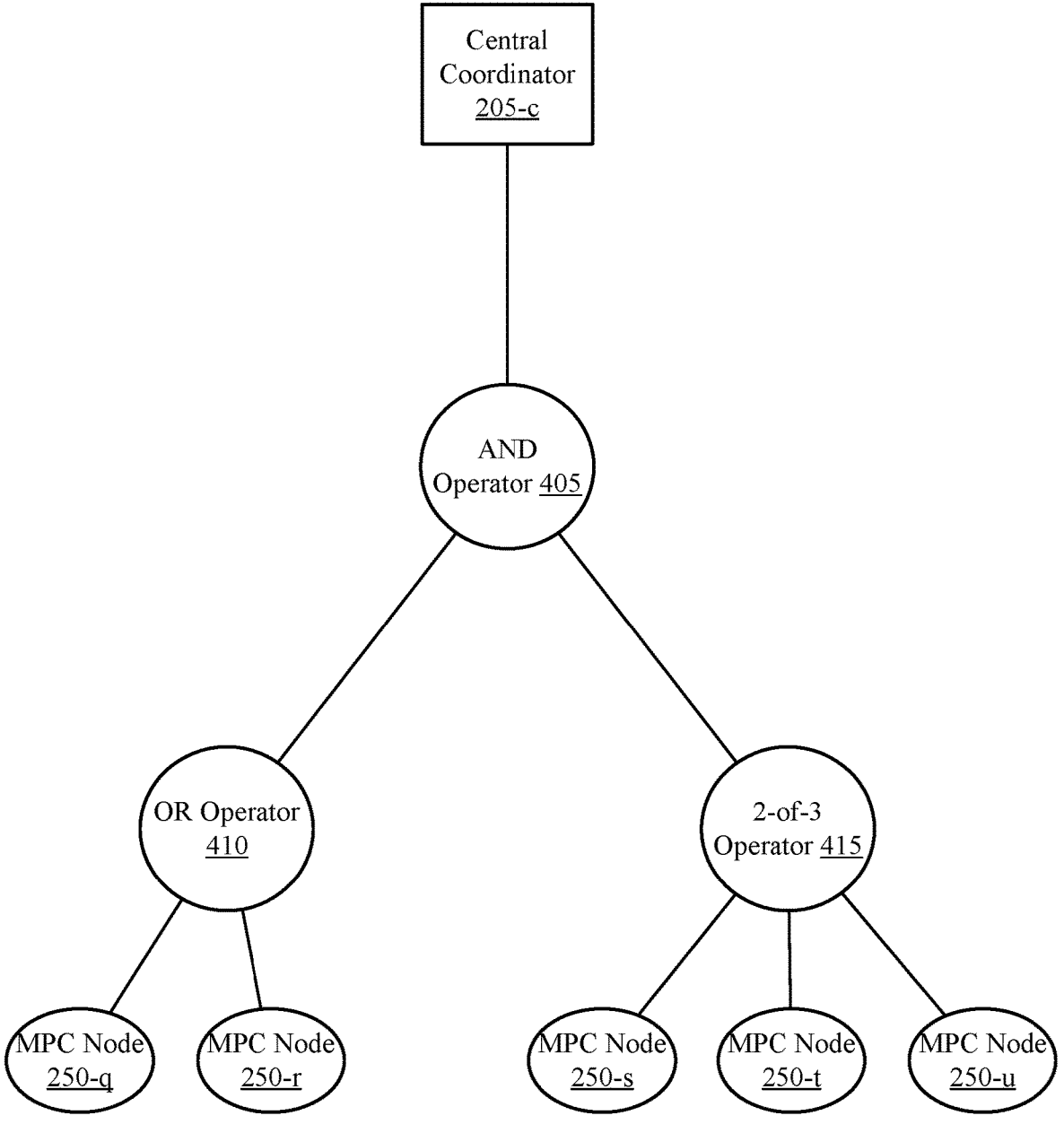
FIG. 4 shows an example diagram of an access structure that supports dynamic key management in accordance with aspects of the present disclosure.

FIG. 4 shows an example of a diagram 400 of an access structure that supports dynamic key management in accordance with aspects of the present disclosure. The access structure may be implemented by a central coordinator 205-*c* and a quantity of nodes (i.e., a MPC node 250-*q*, a MPC node 250-*r*, a MPC node 250-*s*, a MPC node 250-*t*, and a MPC node 250-*u*), which may be examples of corresponding devices as described with respect to FIG. 1 through 3.

The access structure may define how key shares are generated by selected nodes and how key shares are used to perform an operation, such as a signature. After the key shares are generated by the various nodes 250 in accordance with the access structure (e.g., using an MPC key generation function as described herein), the keys may be used to perform the operation. For example, a server (e.g., one or more servers associated with a custodial token platform, a key management service, or the like) may receive a request from a device, and the request may indicate a key identifier, an access structure identifier, or the like. The server may instantiate the central coordinator 205-*c* to manage the MPC operations in accordance with the access structure in response to the request. The central coordinator 205-*c* may include or may have access to data that maps key shares of the access structure to the corresponding MPC nodes (and the corresponding operators). The central coordinator 205-*c* may manage the MPC cryptographic signing function in accordance with the access structure.

As illustrated, the access structure may include an AND operator 405, an OR operator 410, and a threshold operator 415. The OR operator 410 specifies that a key share managed by the MPC node 250-*q* or by the MPC node 250-*r* is to be used for performing an MPC operation for use of the corresponding key. The threshold operator 415 specifies that two out of the three key shares associated with the nodes 250-*s*, 250-*t* and 250-*u* are to perform a respective MPC operation to use the corresponding key. The AND operator 405 specifies that both the functions of the OR operator 410 and the threshold operator 415 be complete to use the corresponding key.

To effect the MPC operations (e.g., the MPC cryptographic signing function), such as to complete a blockchain transaction, for example, the central coordinator 205-*c* may transmit requests to the respective nodes 250 and maintain data associated with the request and completion of the corresponding MPC operations. For example, the central coordinator may transmit requests to the nodes 250-*s*, 250-*t*, and 250-*u*, and the requests may indicate that the nodes are to perform an MPC signature function (using a payload) using the respective key shares. As each key shares performs the MPC operation, the central coordinate may store the result (without revealing a secret) or store an indication of completion of the MPC operation by respective nodes 250. In some examples, the requests sent to the nodes 25-*s*, 250-*t*, and 25-*u* may be approval requests that are asynchronous (as the approvals may be performed based on user interaction) based on the threshold operator 415. After the threshold operator is satisfied based on functions performed by two out of three of the nodes 250-*s*, 250-*t*, and 250-*u*, the central coordinator 205-*c* may transmit, to nodes 250-*q* and 250-*r*, a request to execute an MPC signature function. After one of the nodes 250-*q* and 250-*r* completes the signature function (e.g., based on the OR operator 410), the central coordinator may determine that the access structure is satisfied. The determination may be made based on the data maintained by the central coordinator 205-*c* in association with the transmitted and/or completed requests. After determining that the access structure is satisfied, the central coordinator 205-*c* may transmit an indication of completion of the access structure to a client application, such as a client application that transmitted the request. The indication may include a result of execution of the MPC operations (e.g., a signed payload), which may be used in a transaction that is broadcast to a blockchain network.

In some examples, the access structure may include an expression with a combination of a set of operators (e.g., the AND operator 405, the OR operator 410, the 2-of-3 operator 415, etc.) and a set of key shares. As described herein, the expression may define the combination used to execute an MPC operation. For example, the access structure may be implemented such that the central coordinator 205-*c* may request that either the MPC node 250-*q* or the MPC node 250-*r* and at least two of the MPC node 250-*s*, the MPC node 250-*t*, or the MPC node 250-*u* to generate respective key shares and execute the MPC operation. It should be noted that the coordinator 205-*c* may not have the option to bypass the access structure and/or optionally select nodes that will be used to perform operations, but rather, the access structure essentially requires that the coordinator 205-*c* communicate requests to the MPC nodes 250 in accordance with the access structure. That is, the access structure is enforced by cryptography.

Figure 5:
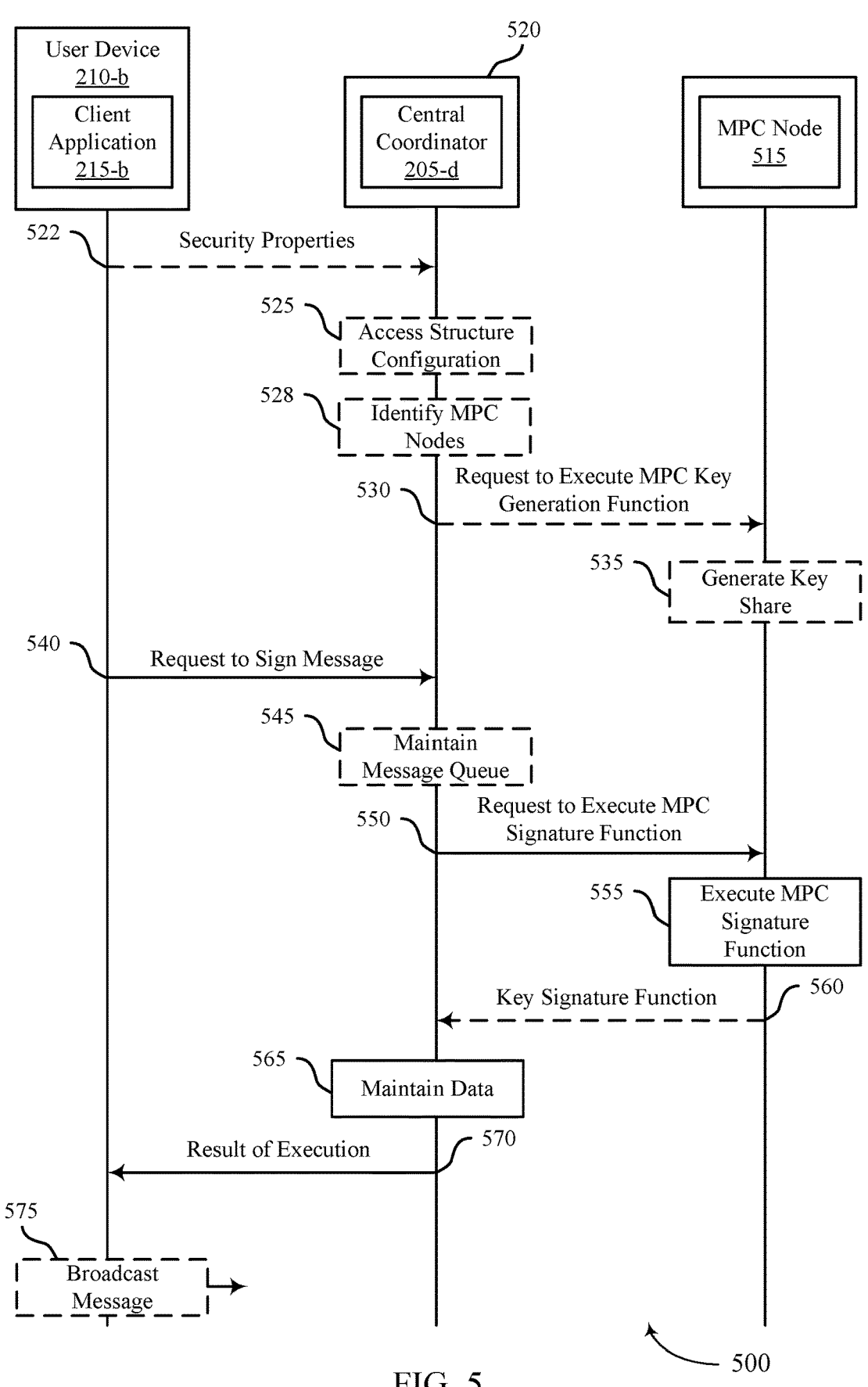
FIG. 5 shows an example of a process flow that supports dynamic key management in accordance with aspects of the present disclosure.

FIG. 5 shows an example of a process flow 500 that supports dynamic key management in accordance with aspects of the present disclosure. The process flow 500 may include a user device 210-*b* with a client application 215-*b*, a central coordinator 205-*d* on a server 520, and an MPC node 515. The user device 210-*b* may be an example of the user devices as described with respect to FIG. 1 and FIG. 2. The central coordinator 205-*d* may be an example of the central coordinators as described with respect to FIGS. 2 through 4. The server 520 may be an example of one or more servers supporting a custodial token platform, a key management service, or both, as described herein. The MPC node 515 may be an example of the nodes as described with respect to FIGS. 1 through 4.

In the following description of the process flow 500, the operations between the user device 210-*b*, central coordinator 205-*d*, the server 520, and the MPC node 515 may be transmitted in a different order than the example order shown, or the operations performed may be performed in different orders or at different times. Some operations may also be omitted from the process flow 500, and other operations may be added to the process flow 500.

At 522, the user device 210-*b* may, via the client application 215-*b*, transmit a set of security properties to the server 520. For example, the server 520 may receive at least one input including a selection of a set of security properties for a key associated with respective key shares. In some cases, a security property of the set of security properties may be associated with a set of parameters (e.g., a geographic location, a quorum, etc.).

At 525, the server 520 may receive an access structure configuration. For example, the server may receive at least one input that configures the access structure based on the respective set of parameters for a respective MPC node of the plurality of MPC nodes. For example, a user may access the client application 215-*a* to select nodes based on the sets of parameters, to use for key generation and management. The user may select nodes based on geographic location, based on whether the nodes are human or computer operated, or based on other parameters as described herein. In some cases, the server 520 may generate the access structure based on the set of security properties At 528, the central coordinator 205-*d* may identify the plurality of MPC nodes for generation of the key shares based on the set of security properties. For example, the central coordinator 205-*d* may identify the plurality of MPC nodes in accordance with the access structure. That is, MPC nodes may be identified such the corresponding parameters satisfy the selected security properties.

At 530, the central coordinator 205-*d* may transmit a request to execute an MPC key generation function to the MPC node 515 of a plurality of MPC nodes. For example, the MPC node may generate a respective key share of a private key using MPC functionality. In some cases, the MPC generation function may be defined by the access structure. Additionally, or alternatively, the MPC generation function may be based on a respective set of parameters associated with the MPC node (e.g., whether the MPC node is an human operator approval node or whether the MPC node is an automated node). In some examples, the central coordinator 205-*d* is instantiated by the server 520 to manage the MPC generation for the plurality of nodes.

At 535, the MPC node 515 may generate key share (of a private key) to be stored in the MPC node 515. The MPC node 515 may generate the key share based on the request and using MPC functionality, as described herein.

At 540, the client application 215-*b* of the user device 210-*b* may transmit a request to sign a message to the central coordinator 205-*d*. In some examples, the request is transmitted to one or more servers associated with the central coordinator 205-*d*, and the central coordinator 205-*d* is instantiated by the one or more servers after or in response to receiving the request. For example, the request may be to sign the message using respective key shares generated by a plurality of MPC nodes. As described herein, key shares may be generated in accordance with an access structure, and the access structure may be configured based on a respective set of parameters for a respective MPC node of the plurality of MPC nodes. In some cases, the message may be configured for broadcast via a blockchain network.

In some cases, a respective set of parameters may be indicative of a geographic location of a corresponding MPC node, whether the corresponding MPC node is fully automated, whether the MPC node is operated via artificial intelligence (AI), whether the MPC node is human-operated, whether the MPC node is stored in a public cloud, whether the MPC node is stored in a private datacenter, a datacenter type of the MPC node, or any combination thereof.

In some cases, the access structure may include an expression with a combination of a set of operators and a set of key shares. Additionally, or alternatively, the expression may define the combination used to execute an MPC operation. In some cases, the set of operators may include an AND operator, an OR operator, or a threshold operator defining a threshold quantity of key shares of a total quantity of key shares, or a combination thereof.

At 545, the central coordinator 205-*d* may maintain a message queue. For example, the message queue may correspond to operations performed by the plurality of MPC nodes, a state machine associated with the MPC signature function, or both. In some examples, the central coordinator 205-*d* may generate the message queue based on the access structure. In some cases, the central coordinator 205-*d* may not read the message queue based on an encryption of the messages. For example, the MPC node 515 of a plurality of MPC nodes may encrypt the messages (e.g., such that the messages are only readable by the MPC node a message is intended for).

At 550, the central coordinator 205-*d* may transmit a request to execute an MPC signature function to the MPC node 515 of a plurality of MPC nodes. For example, the central coordinator 205-*d* may transmit the request after receiving the request to sign a message at 540 from the user device 210-*b*. In some cases, the MPC signature function may be defined by an access structure and may be based on the respective set of parameters associated with the MPC node.

In some cases, the central coordinator 205-*d* may transmit a request to a first set of MPC nodes of the plurality of MPC nodes perform an asynchronous approval in accordance with the access structure having a threshold operator that defines a threshold quantity of key shares of a total quantity of key shares generated at the first set of MPC nodes. Additionally, or alternatively, after the threshold quantity is satisfied by approvals by MPC nodes of the first set of MPC nodes, the central coordinator 205-*d* may transmit a request to execute the MPC signature function to at least one second MPC node of the plurality of MPC nodes.

At 555, the MPC node 515 may execute the MPC signature function. For example, the MPC node 515 of the plurality of MPC nodes may collaborate via MPC algorithms to produce a cryptographic signature. For example, the plurality of MPC nodes may collaborate to allow use of the key (e.g., without assembling the key).

At 560, the MPC node 515 may transmit a result of the key signature function to the central coordinator 205-*d*. For example, the MPC node 515 of the plurality of MPC nodes may transmit the cryptographic signature to the central coordinator 205-*d* based on the collaboration to produce the cryptographic signature via MPC algorithms. The result of the MPC function may be communicated to the central coordinator 205-*d*, another MPC node, or both, and the secret (e.g., key share) may not be revealed to the central coordinator 205-*d* or the other MPC nodes.

At 565, the central coordinator 205-*d* may maintain data (e.g., in conjunction with the message queue) associated with execution of the MPC signature function by at least a subset of the plurality of MPC nodes using the respective key shares. In some cases, the central coordinator 205-*d* may store data indicating a mapping between the respective key shares and the plurality of MPC nodes such as to coordinate transmission of messages between the MPC nodes before, during, or after completion of MPC functions by other MPC nodes associated with the access structure.

At 565, the central coordinator 205-*d* may transmit a result of execution of the MPC signature function by at least the subset of the plurality of MPC nodes to the user device 210-*b*. For example, the central coordinator 205-*d* may transmit the result of execution based on the data being indicative of satisfaction of the access structure. The result may include a signed payload.

At 575, the client application 215-*b* may broadcast a message via a blockchain network. The broadcast message may include an indication of the signature performed based on the access structure and based on coordination with the MPC nodes by the central coordinator 205-*d*.

Figure 6:
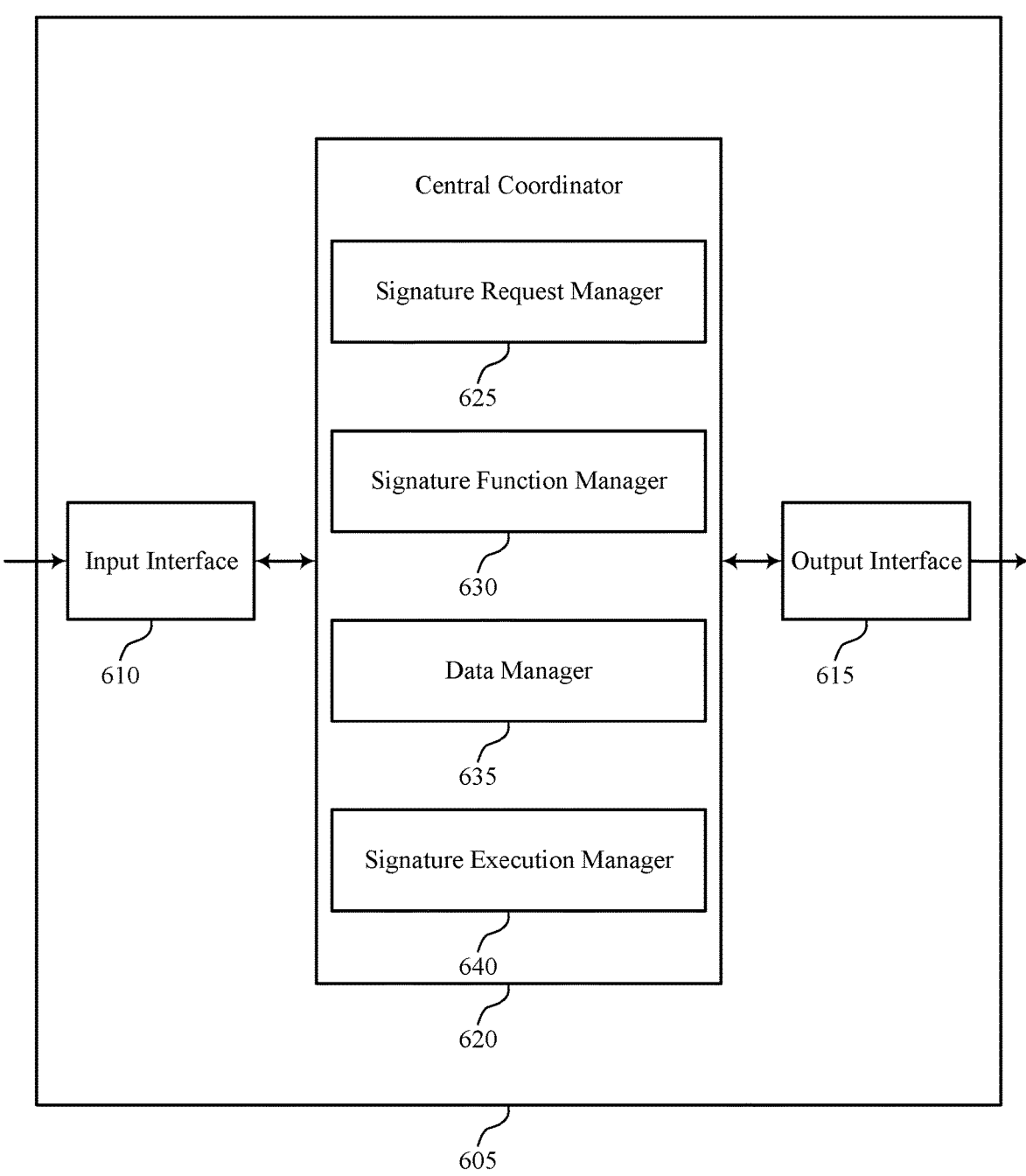
FIG. 6 shows a block diagram of an apparatus that supports dynamic key management in accordance with aspects of the present disclosure.

FIG. 6 shows a block diagram 600 of a device 605 that supports dynamic key management in accordance with aspects of the present disclosure. The device 605 may include an input interface 610, an output interface 615, and a central coordinator 620. The device 605 may also include a processor. Each of these components may communicate, directly or indirectly, with one another (e.g., via one or more buses, communications links, communications interfaces, or any combination thereof).

The input interface 610 may manage input signaling for the device 605. For example, the input interface 610 may receive input signaling (e.g., messages, packets, data, instructions, commands, transactions, or any other form of encoded information) from other systems or devices. The input interface 610 may send signaling corresponding to (e.g., representative of or otherwise based on) such input signaling to other components of the device 605 for processing. For example, the input interface 610 may transmit such corresponding signaling to the central coordinator 620 to support dynamic key management. In some cases, the input interface 610 may be a component of a network interface 825 as described with reference to FIG. 8.

The output interface 615 may manage output signaling for the device 605. For example, the output interface 615 may receive signaling from other components of the device 605, such as the central coordinator 620, and may transmit such output signaling corresponding to (e.g., representative of or otherwise based on) such signaling to other systems or devices. In some cases, the output interface 615 may be a component of a network interface 825 as described with reference to FIG. 8.

For example, the central coordinator 620 may include a signature request manager 625, a signature function manager 630, a data manager 635, a signature execution manager 640, or any combination thereof. In some examples, the central coordinator 620, or various components thereof, may be configured to perform various operations (e.g., receiving, monitoring, transmitting) using or otherwise in cooperation with the input interface 610, the output interface 615, or both. For example, the central coordinator 620 may receive information from the input interface 610, send information to the output interface 615, or be integrated in combination with the input interface 610, the output interface 615, or both to receive information, transmit information, or perform various other operations as described herein.

The central coordinator 620 may support data management in accordance with examples as disclosed herein. The signature request manager 625 may be configured as or otherwise support a means for receiving, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes. The signature function manager 630 may be configured as or otherwise support a means for transmitting, after receiving the request and to an MPC node of the plurality of MPC nodes, a request to execute a MPC signature function using a respective key share, wherein the MPC signature function is defined by the access structure and is based at least in part on a respective set of parameters associated with the MPC node. The data manager 635 may be configured as or otherwise support a means for maintaining data associated with execution of the MPC signature function by at least a subset of the plurality of MPC nodes using the respective key shares. The signature execution manager 640 may be configured as or otherwise support a means for transmitting, to the client and based at least in part on the data being indicative of satisfaction of the access structure, a result of execution of the MPC signature function by at least the subset of the plurality of MPC nodes.

Figure 7:
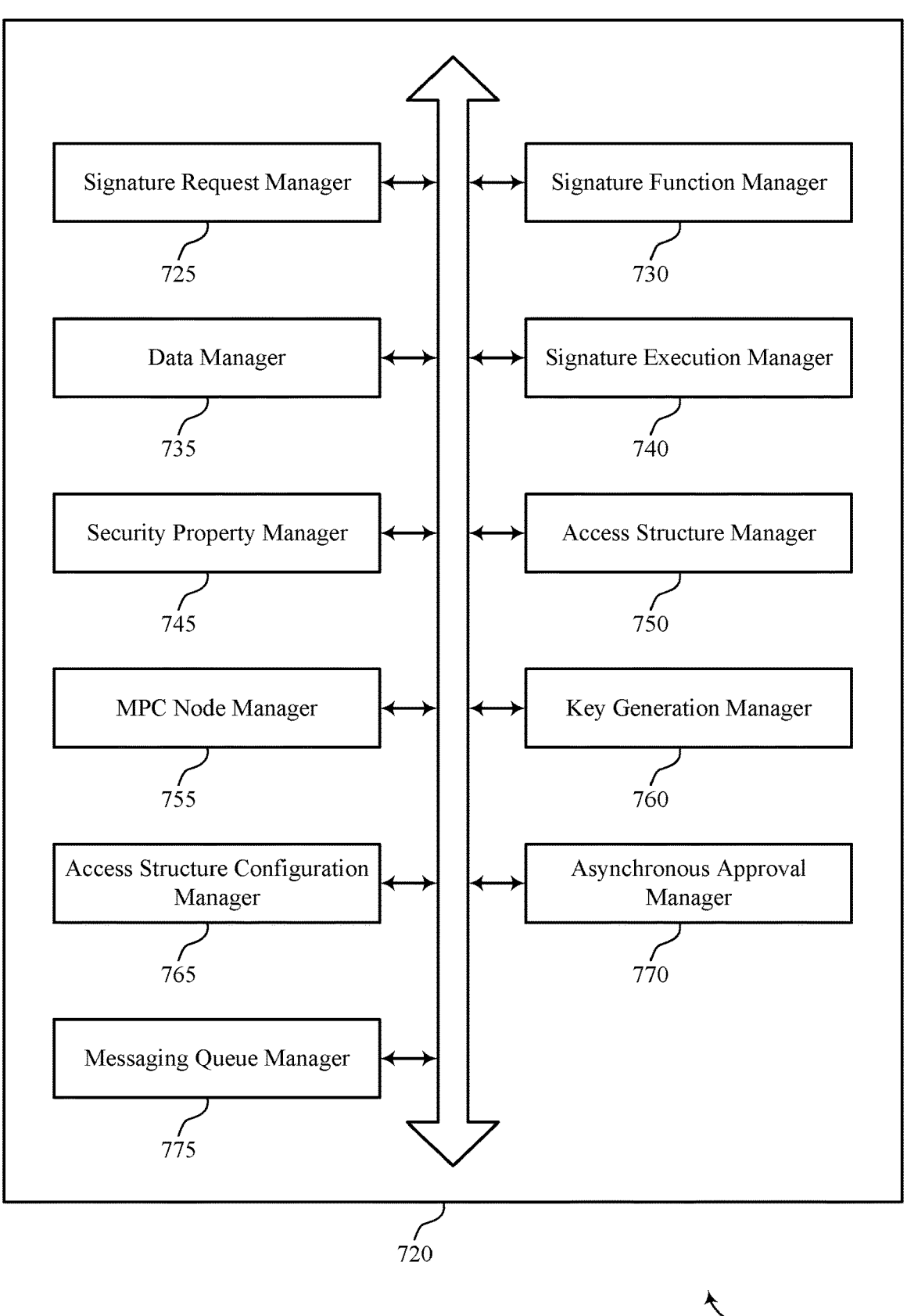
FIG. 7 shows a block diagram of a central coordinator that supports dynamic key management in accordance with aspects of the present disclosure.

FIG. 7 shows a block diagram 700 of a central coordinator 720 that supports dynamic key management in accordance with aspects of the present disclosure. The central coordinator 720 may be an example of aspects of a central coordinator or a central coordinator 620, or both, as described herein. The central coordinator 720, or various components thereof, may be an example of means for performing various aspects of dynamic key management as described herein. For example, the central coordinator 720 may include a signature request manager 725, a signature function manager 730, a data manager 735, a signature execution manager 740, a security property manager 745, an access structure manager 750, an MPC node manager 755, a key generation manager 760, an access structure configuration manager 765, an asynchronous approval manager 770, a messaging queue manager 775, or any combination thereof. Each of these components, or components of sub-components thereof (e.g., one or more processors, one or more memories), may communicate, directly or indirectly, with one another (e.g., via one or more buses).

The central coordinator 720 may support data management in accordance with examples as disclosed herein. The signature request manager 725 may be configured as or otherwise support a means for receiving, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes. The signature function manager 730 may be configured as or otherwise support a means for transmitting, after receiving the request and to an MPC node of the plurality of MPC nodes, a request to execute a MPC signature function using a respective key share of the private key, wherein the MPC signature function is defined by the access structure and is based at least in part on a respective set of parameters associated with the MPC node. The data manager 735 may be configured as or otherwise support a means for maintaining data associated with execution of the MPC signature function by at least a subset of the plurality of MPC nodes using the respective key shares. The signature execution manager 740 may be configured as or otherwise support a means for transmitting, to the client and based at least in part on the data being indicative of satisfaction of the access structure, a result of execution of the MPC signature function by at least the subset of the plurality of MPC nodes.

In some examples, the security property manager 745 may be configured as or otherwise support a means for receiving, from a user, at least one input comprising a selection of a set of security properties for a key associated with the respective key shares. In some examples, the access structure manager 750 may be configured as or otherwise support a means for generating, based at least in part on the set of security properties, the access structure. In some examples, the MPC node manager 755 may be configured as or otherwise support a means for identifying, based at least in part on the set of security properties, the plurality of MPC nodes for generation of the key shares in accordance with the access structure.

In some examples, the key generation manager 760 may be configured as or otherwise support a means for transmitting, to a MPC node of a plurality of MPC nodes, a request to execute a MPC key generation function to generate the respective key shares of a private key, wherein the MPC generation function is defined by the access structure and is based on the respective set of parameters associated with the MPC node.

In some examples, a respective set of parameters is indicative of a geographic location of a corresponding MPC node, whether the corresponding MPC node is fully automated, whether the MPC node is operated via artificial intelligence (AI), whether the MPC node is human-operated, whether the MPC node is stored in a public cloud, whether the MPC node is stored in a private datacenter, a datacenter type of the MPC node, or any combination thereof.

In some examples, the access structure configuration manager 765 may be configured as or otherwise support a means for receiving at least one input that configures the access structure based at least in part on the respective sets of parameters for the plurality of MPC nodes.

In some examples, the access structure includes an expression with a combination of a set of operators and a set of key shares. In some examples, the expression defines the combination used to execute an MPC operation.

In some examples, the set of operators includes an AND operator, an OR operator, or a threshold operator defining a threshold quantity of key shares of a total quantity of key shares, or a combination thereof.

In some examples, to support transmitting the request to execute a MPC signature function, the asynchronous approval manager 770 may be configured as or otherwise support a means for transmitting, to a first set of MPC nodes of the plurality of MPC nodes, a request to perform an asynchronous approval in accordance with the access structure having a threshold operator that defines a threshold quantity of key shares of a total quantity of key shares generated by the first set of MPC nodes. In some examples, to support transmitting the request to execute a MPC signature function, the signature execution manager 740 may be configured as or otherwise support a means for transmitting, to at least one second MPC node of the plurality of MPC nodes and after the threshold quantity is satisfied by approvals by MPC nodes of the first set of MPC nodes, a request to execute the MPC signature function.

In some examples, the message is configured for broadcast via a blockchain network.

In some examples, to support maintaining data, the messaging queue manager 775 may be configured as or otherwise support a means for maintaining a messaging queue corresponding to operations performed by the plurality of MPC nodes, a state machine associated with the MPC signature function, or both.

Figure 8:
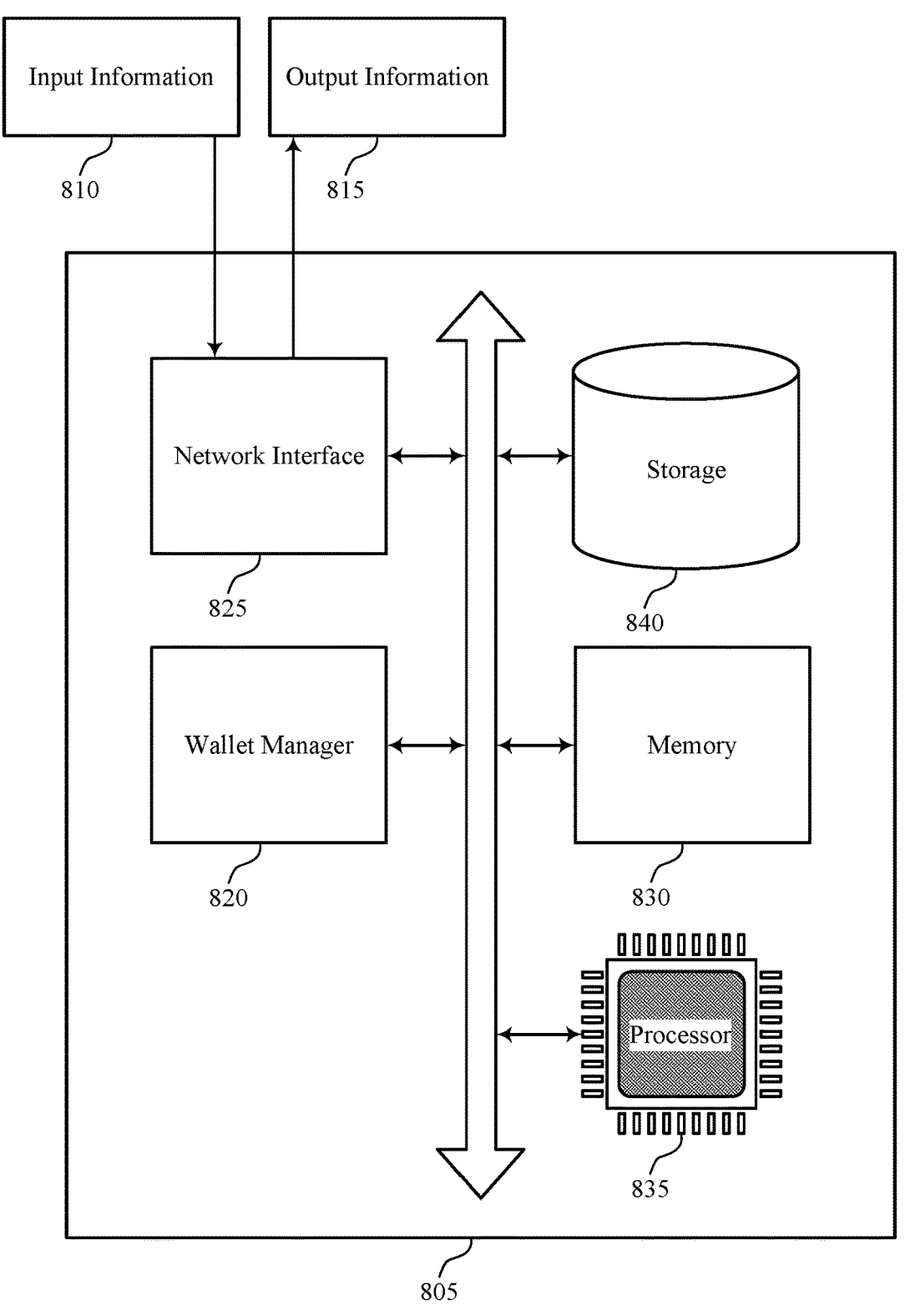
FIG. 8 shows a diagram of a system including a device that supports dynamic key management in accordance with aspects of the present disclosure.

FIG. 8 shows a diagram of a system 800 including a device 805 that supports dynamic key management in accordance with aspects of the present disclosure. The device 805 may be an example of or include the components of a device

605 as described herein. The device 805 may include components for key management, transaction management, blockchain communication, and the like, including devices or components such as a central coordinator 820, an input information 810, an output information 815, a network interface 825, a memory 830, a processor 835, and a storage 840. Each of these components may communicate, directly or indirectly, with one another (e.g., via one or more buses, communications links, communications interfaces, or any combination thereof).

The network interface 825 may enable the device 805 to exchange information (e.g., input information 810, output information 815, or both) with other systems or devices (not shown). For example, the network interface 825 may enable the device 805 to connect to a network (e.g., a network 135 as described herein). The network interface 825 may include one or more wireless network interfaces, one or more wired network interfaces, or any combination thereof.

Memory 830 may include RAM, ROM, or both. The memory 830 may store computer-readable, computer-executable software including instructions that, when executed, cause the processor 835 to perform various functions described herein, such as functions supporting dynamic key management. In some cases, the memory 830 may contain, among other things, a basic input/output system (BIOS), which may control basic hardware or software operation such as the interaction with peripheral components or devices. In some cases, the memory 830 may be an example of aspects of one or more components of a custodial token platform 110 as described with reference to FIG. 1.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting dynamic key management). Though a single processor 835 is depicted in the example of FIG. 8, it is to be understood that the device 805 may include any quantity of one or more of processors 835 and that a group of processors 835 may collectively perform one or more functions ascribed herein to a processor, such as the processor 835.

Storage 840 may be configured to store data that is generated, processed, stored, or otherwise used by the device 805. In some cases, the storage 840 may include one or more HDDs, one or more SDDs, or both. In some examples, the storage 840 may be an example of a single database, a distributed database, multiple distributed databases, a data store, a data lake, or an emergency backup database.

The central coordinator 820 may support data management in accordance with examples as disclosed herein. For example, the central coordinator 820 may be configured as or otherwise support a means for receiving, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes. The central coordinator 820 may be configured as or otherwise support a means for transmitting, after receiving the request and to an MPC node of the plurality of MPC nodes, a request to execute a MPC signature function using a respective key share, wherein the MPC signature function is defined by the access structure and is based at least in part on a respective set of parameters associated with the MPC node. The central coordinator 820 may be configured as or otherwise support a means for maintaining data associated with execution of the MPC signature function by at least a subset of the plurality of MPC nodes using the respective key shares. The central coordinator 820 may be configured as or otherwise support a means for transmitting, to the client and based at least in part on the data being indicative of satisfaction of the access structure, a result of execution of the MPC signature function by at least the subset of the plurality of MPC nodes.

By including or configuring the central coordinator 820 in accordance with examples as described herein, the device 805 may support techniques for more dynamic and adaptable key management and more secure key management. In some examples, these techniques improve key management for blockchain protocol communications and transactions.

FIG. 9 shows a flowchart illustrating a method 900 that supports dynamic key management in accordance with aspects of the present disclosure. The operations of the method 900 may be implemented by a custodial token platform, one or more servers, or associated components as described herein. For example, the operations of the method 900 may be performed by a custodial token platform or a server as described with reference to FIGS. 1 through 8. In some examples, a custodial token platform or a server may execute a set of instructions to control the functional elements of the custodial token platform to perform the described functions. Additionally, or alternatively, the custodial token platform may perform aspects of the described functions using special-purpose hardware.

At 905, the method may include receiving, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes. The operations of block 905 may be performed in accordance with examples as disclosed herein. In some examples, aspects of the operations of 905 may be performed by a signature request manager 725 as described with reference to FIG. 7.

At 910, the method may include transmitting, after receiving the request and to an MPC node of the plurality of MPC nodes, a request to execute a MPC signature function using a respective key share, wherein the MPC signature function is defined by the access structure and is based at least in part on a respective set of parameters associated with the MPC node. The operations of block 910 may be performed in accordance with examples as disclosed herein. In some examples, aspects of the operations of 910 may be performed by a signature function manager 730 as described with reference to FIG. 7.

At 915, the method may include maintaining data associated with execution of the MPC signature function by at least a subset of the plurality of MPC nodes using the respective key shares. The operations of block 915 may be performed in accordance with examples as disclosed herein. In some examples, aspects of the operations of 915 may be performed by a data manager 735 as described with reference to FIG. 7.

At 920, the method may include transmitting, to the client and based at least in part on the data being indicative of satisfaction of the access structure, a result of execution of the MPC signature function by at least the subset of the plurality of MPC nodes. The operations of block 920 may be performed in accordance with examples as disclosed herein. In some examples, aspects of the operations of 920 may be performed by a signature execution manager 740) as described with reference to FIG. 7.

FIG. 10 shows a flowchart illustrating a method 1000 that supports dynamic key management in accordance with aspects of the present disclosure. The operations of the method 1000 may be implemented by a custodial token platform, one or more servers, or associated components as described herein. For example, the operations of the method 1000 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 1005, the method may include receiving, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes. The operations of block 1005 may be performed in accordance with examples as disclosed herein. In some examples, aspects of the operations of 1005 may be performed by a signature request manager 725 as described with reference to FIG. 7.

At 1010, the method may include transmitting, to a MPC node of a plurality of MPC nodes, a request to execute a MPC key generation function to generate the respective key shares of a private key, wherein the MPC generation function is defined by the access structure and is based on the respective set of parameters associated with the MPC node. The operations of block 1010 may be performed in accordance with examples as disclosed herein. In some examples, aspects of the operations of 1010 may be performed by a key generation manager 745 as described with reference to FIG. 7.

At 1015, the method may include transmitting, after receiving the request and to an MPC node of the plurality of MPC nodes, a request to execute a MPC signature function using a respective key share, wherein the MPC signature function is defined by the access structure and is based at least in part on a respective set of parameters associated with the MPC node. The operations of block 1015 may be performed in accordance with examples as disclosed herein. In some examples, aspects of the operations of 1015 may be performed by a signature function manager 730 as described with reference to FIG. 7.

At 1020, the method may include maintaining data associated with execution of the MPC signature function by at least a subset of the plurality of MPC nodes using the respective key shares. The operations of block 1020 may be performed in accordance with examples as disclosed herein. In some examples, aspects of the operations of 1020 may be performed by a data manager 735 as described with reference to FIG. 7.

At 1025, the method may include transmitting, to the client and based at least in part on the data being indicative of satisfaction of the access structure, a result of execution of the MPC signature function by at least the subset of the plurality of MPC nodes. The operations of block 1025 may be performed in accordance with examples as disclosed herein. In some examples, aspects of the operations of 1025 may be performed by a signature execution manager 740) as described with reference to FIG. 7.

A method for data management is described. The method may include receiving, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes, transmitting, after receiving the request and to an MPC node of the plurality of MPC nodes, a request to execute a MPC signature function using a respective key share, wherein the MPC signature function is defined by the access structure and is based at least in part on a respective set of parameters associated with the MPC node, maintaining data associated with execution of the MPC signature function by at least a subset of the plurality of MPC nodes using the respective key shares, and transmitting, to the client and based at least in part on the data being indicative of satisfaction of the access structure, a result of execution of the MPC signature function by at least the subset of the plurality of MPC nodes.

An apparatus for data management is described. The apparatus may include at least one processor, memory coupled with the at least one processor, and instructions stored in the at least one memory. The instructions may be executable by the at least one processor to cause the apparatus to receive, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes, transmit, after receiving the request and to an MPC node of the plurality of MPC nodes, a request to execute a MPC signature function using a respective key share, wherein the MPC signature function is defined by the access structure and is based at least in part on a respective set of parameters associated with the MPC node, maintain data associated with execution of the MPC signature function by at least a subset of the plurality of MPC nodes using the respective key shares, and transmit, to the client and based at least in part on the data being indicative of satisfaction of the access structure, a result of execution of the MPC signature function by at least the subset of the plurality of MPC nodes.

Another apparatus for data management is described. The apparatus may include means for receiving, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes, means for transmitting, after receiving the request and to an MPC node of the plurality of MPC nodes, a request to execute a MPC signature function using a respective key share, wherein the MPC signature function is defined by the access structure and is based at least in part on a respective set of parameters associated with the MPC node, means for maintaining data associated with execution of the MPC signature function by at least a subset of the plurality of MPC nodes using the respective key shares, and means for transmitting, to the client and based at least in part on the data being indicative of satisfaction of the access structure, a result of execution of the MPC signature function by at least the subset of the plurality of MPC nodes.

A non-transitory computer-readable medium storing code for data management is described. The code may include instructions executable by at least one processor to receive, from a client, a request to sign a message using respective key shares generated by a plurality of multi-party computation (MPC) nodes, wherein key shares are generated in accordance with an access structure and the access structure is configured based at least in part on a respective set of parameters for a respective MPC node of the plurality of MPC nodes, transmit, after receiving the request and to an MPC node of the plurality of MPC nodes, a request to execute a MPC signature function using a respective key share, wherein the MPC signature function is defined by the access structure and is based at least in part on a respective set of parameters associated with the MPC node, maintain data associated with execution of the MPC signature function by at least a subset of the plurality of MPC nodes using the respective key shares, and transmit, to the client and based at least in part on the data being indicative of satisfaction of the access structure, a result of execution of the MPC signature function by at least the subset of the plurality of MPC nodes.

Some examples of the method, apparatuses, and non-transitory computer-readable medium described herein may further include operations, features, means, or instructions for transmitting, to a MPC node of a plurality of MPC nodes, a request to execute a MPC key generation function to generate the respective key shares of a private key, wherein the MPC generation function may be defined by the access structure and may be based on the respective set of parameters associated with the MPC node.

In some examples of the method, apparatuses, and non-transitory computer-readable medium described herein, a respective set of parameters may be indicative of a geographic location of a corresponding MPC node, whether the corresponding MPC node may be fully automated, whether the MPC node may be operated via artificial intelligence (AI), whether the MPC node may be human-operated, whether the MPC node may be stored in a public cloud, whether the MPC node may be stored in a private datacenter, a datacenter type of the MPC node, or any combination thereof.

Some examples of the method, apparatuses, and non-transitory computer-readable medium described herein may further include operations, features, means, or instructions for receiving at least one input that configures the access structure based at least in part on the respective set of parameters for a respective MPC node of the plurality of MPC nodes.

In some examples of the method, apparatuses, and non-transitory computer-readable medium described herein, the access structure includes an expression with a combination of a set of operators and a set of key shares and the expression defines the combination used to execute an MPC operation.

In some examples of the method, apparatuses, and non-transitory computer-readable medium described herein, the set of operators includes an AND operator, an OR operator, or a threshold operator defining a threshold quantity of key shares of a total quantity of key shares, or a combination thereof.

In some examples of the method, apparatuses, and non-transitory computer-readable medium described herein, transmitting the request to execute a MPC signature function may include operations, features, means, or instructions for transmitting, to a first set of MPC nodes of the plurality of MPC nodes, a request to perform an asynchronous approval in accordance with the access structure having a threshold operator that defines a threshold quantity of key shares of a total quantity of key shares generated by the first set of MPC nodes and transmitting, to at least one second MPC node of the plurality of MPC nodes and after the threshold quantity may be satisfied by approvals by MPC nodes of the first set of MPC nodes, a request to execute the MPC signature function.

In some examples of the method, apparatuses, and non-transitory computer-readable medium described herein, the message may be configured for broadcast via a blockchain network.

In some examples of the method, apparatuses, and non-transitory computer-readable medium described herein, maintaining data may include operations, features, means, or instructions for maintaining a messaging queue corresponding to operations performed by the plurality of MPC nodes, a state machine associated with the MPC signature function, or both.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
receiving, from a user, at least one input comprising a selection of a set of security properties for a key associated with respective key shares, wherein the set of security properties includes at least a threshold quantity of key shares and an operational property different from the threshold quantity of key shares;
receiving, from a client, a request to sign a message using the respective key shares generated by a plurality of multi-party computation (MPC) nodes, wherein key shares are generated in accordance with an access structure and the access structure is configured based at least in part on a respective set of parameters for a respective MPC node of the plurality of MPC nodes, wherein the respective set of parameters corresponds to the set of security properties, and wherein a first set of parameters for a first MPC node of the plurality of MPC nodes includes the threshold quantity of key shares and a second set of parameters for a second MPC node of the plurality of MPC nodes includes the operational property;
transmitting, after receiving the request and to at least the first MPC node and the second MPC node of the plurality of MPC nodes, a request to execute a MPC signature function using the respective key shares, wherein the MPC signature function is defined by the access structure and is based at least in part on the first set of parameters and the second set of parameters;
maintaining data associated with execution of the MPC signature function by at least the first MPC node and the second MPC node of the plurality of MPC nodes using the respective key shares, wherein the data comprises a messaging queue corresponding to operations performed by the plurality of MPC nodes, a state machine associated with the MPC signature function, or both; and
transmitting, to the client and based at least in part on the data being indicative of satisfaction of the access structure, a result of execution of the MPC signature function by at least the first MPC node and the second MPC node of the plurality of MPC nodes.

2. The method of claim 1, further comprising:
generating, based at least in part on the set of security properties, the access structure; and
identifying, based at least in part on the set of security properties, at least the first MPC node and the second MPC node of the plurality of MPC nodes for generation of the respective key shares in accordance with the access structure.

3. The method of claim 1, further comprising:
transmitting, to a MPC node of the plurality of MPC nodes, a request to execute a MPC key generation function to generate one of the respective key shares of a private key, wherein the MPC key generation function is defined by the access structure and is based on the respective set of parameters associated with the MPC node.

4. The method of claim 1, wherein the operational property is indicative of a geographic location of the second MPC node, whether the second MPC node is fully automated, whether the second MPC node is operated via artificial intelligence (AI), whether the second MPC node is human-operated, whether the second MPC node is stored in a public cloud, whether the second MPC node is stored in a private datacenter, a datacenter type of the second MPC node, or any combination thereof.

5. The method of claim 1, further comprising:
receiving at least one second input that configures the access structure based at least in part on the respective set of parameters for the respective MPC node of the plurality of MPC nodes.

6. The method of claim 1, wherein:
the access structure includes an expression with a combination of a set of operators and a set of key shares, and
the expression defines the combination used to execute an MPC operation.

7. The method of claim 6, wherein the set of operators includes an AND operator, an OR operator, or a threshold operator defining the threshold quantity of key shares of a total quantity of key shares, or a combination thereof.

8. The method of claim 1, wherein transmitting the request to execute the MPC signature function comprises:
transmitting, to a first set of MPC nodes of the plurality of MPC nodes comprising the first MPC node, a request to perform an asynchronous approval in accordance with the access structure having a threshold operator that defines the threshold quantity of key shares of a total quantity of key shares generated by the first set of MPC nodes; and
transmitting, to at least one second MPC node of the plurality of MPC nodes and after the threshold quantity is satisfied by approvals by MPC nodes of the first set of MPC nodes, a request to execute the MPC signature function.

9. The method of claim 1, wherein the message is configured for broadcast via a blockchain network.

10. An apparatus for data management, comprising:
at least one processor;
memory coupled with the at least one processor; and
instructions stored in the memory and executable by the at least one processor to cause the apparatus to:
receive, from a user, at least one input comprising a selection of a set of security properties for a key associated with respective key shares, wherein the set of security properties includes at least a threshold quantity of key shares and an operational property different from the threshold quantity of key shares;
receive, from a client, a request to sign a message using the respective key shares generated by a plurality of multi-party computation (MPC) nodes, wherein key shares are generated in accordance with an access structure and the access structure is configured based at least in part on a respective set of parameters for a respective MPC node of the plurality of MPC nodes, wherein the respective set of parameters corresponds to the set of security properties, and wherein a first set of parameters for a first MPC node of the plurality of MPC nodes includes the threshold quantity of key shares and a second set of parameters for a second MPC node of the plurality of MPC nodes includes the operational property;
transmit, after receiving the request and to at least the first MPC node and the second MPC node of the plurality of MPC nodes, a request to execute a MPC signature function using the respective key shares, wherein the MPC signature function is defined by the access structure and is based at least in part on the first set of parameters and the second set of parameters;

maintain data associated with execution of the MPC signature function by at least a subset of the plurality of MPC nodes using the respective key shares, wherein the data comprises a messaging queue corresponding to operations performed by the plurality of MPC nodes, a state machine associated with the MPC signature function, or both; and
transmit, to the client and based at least in part on the data being indicative of satisfaction of the access structure, a result of execution of the MPC signature function by at least the first MPC node and the second MPC node of the plurality of MPC nodes.

11. The apparatus of claim 10, wherein the instructions are further executable by the at least one processor to cause the apparatus to:
transmit, to a MPC node of the plurality of MPC nodes, a request to execute a MPC key generation function to generate the respective key shares of a private key, wherein the MPC key generation function is defined by the access structure and is based on the respective set of parameters associated with the MPC node.

12. The apparatus of claim 10, wherein the operational property is indicative of a geographic location of the second MPC node, whether the second MPC node is fully automated, whether the second MPC node is operated via artificial intelligence (AI), whether the second MPC node is human-operated, whether the second MPC node is stored in a public cloud, whether the second MPC node is stored in a private datacenter, a datacenter type of the second MPC node, or any combination thereof.

13. The apparatus of claim 10, wherein the instructions are further executable by the at least one processor to cause the apparatus to:
receive at least one second input that configures the access structure based at least in part on the respective set of parameters for the respective MPC node of the plurality of MPC nodes.

14. The apparatus of claim 10, wherein:
the access structure includes an expression with a combination of a set of operators and a set of key shares, and
the expression defines the combination used to execute an MPC operation.

15. The apparatus of claim 14, wherein the set of operators includes an AND operator, an OR operator, or a threshold operator defining the threshold quantity of key shares of a total quantity of key shares, or a combination thereof.

16. The apparatus of claim 10, wherein the instructions to transmit the request to execute a MPC signature function are executable by the at least one processor to cause the apparatus to:
transmit, to a first set of MPC nodes of the plurality of MPC nodes, a request to perform an asynchronous approval in accordance with the access structure having a threshold operator that defines the threshold quantity of key shares of a total quantity of key shares generated by the first set of MPC nodes; and
transmit, to at least one second MPC node of the plurality of MPC nodes and after the threshold quantity is satisfied by approvals by MPC nodes of the first set of MPC nodes, a request to execute the MPC signature function.

17. The apparatus of claim 10, wherein the message is configured for broadcast via a blockchain network.

18. A non-transitory computer-readable medium storing code for data management, the code comprising instructions executable by at least one processor to:

receive, from a user, at least one input comprising a selection of a set of security properties for a key associated with respective key shares, wherein the set of security properties includes at least a threshold quantity of key shares and an operational property different from the threshold quantity of key shares;

receive, from a client, a request to sign a message using the respective key shares generated by a plurality of multi-party computation (MPC) nodes, wherein key shares are generated in accordance with an access structure and the access structure is configured based at least in part on a respective set of parameters for a respective MPC node of the plurality of MPC nodes, wherein the respective set of parameters corresponds to the set of security properties, and wherein a first set of parameters for a first MPC node of the plurality of MPC nodes includes the threshold quantity of key shares and a second set of parameters for a second MPC node of the plurality of MPC nodes includes the operational property;

transmit, after receiving the request and to at least the first MPC node and the second MPC node of the plurality of MPC nodes, a request to execute a MPC signature function using the respective key shares, wherein the MPC signature function is defined by the access structure and is based at least in part on the first set of parameters and the second set of parameters;

maintain data associated with execution of the MPC signature function by at least a subset of the plurality of MPC nodes using the respective key shares, wherein the data comprises a messaging queue corresponding to operations performed by the plurality of MPC nodes, a state machine associated with the MPC signature function, or both; and transmit, to the client and based at least in part on the data being indicative of satisfaction of the access structure, a result of execution of the MPC signature function by at least the first MPC node and the second MPC node of the plurality of MPC nodes.

* * * * *